(12) United States Patent
Nammi et al.

(10) Patent No.: US 9,906,980 B2
(45) Date of Patent: Feb. 27, 2018

(54) METHODS TO SIGNAL CURRENT MIMO STREAM INTERFERENCE MITIGATION STATUS

(71) Applicant: Telefonaktiebolaget L M Ericsson (publ), Stockholm (SE)

(72) Inventors: Sairamesh Nammi, Kista (SE); Muhammad Kazmi, Bromma (SE); Maomao Chen, Arlöv (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 105 days.

(21) Appl. No.: 14/652,703

(22) PCT Filed: Apr. 29, 2015

(86) PCT No.: PCT/SE2015/050482
§ 371 (c)(1),
(2) Date: Jun. 16, 2015

(87) PCT Pub. No.: WO2015/171050
PCT Pub. Date: Nov. 12, 2015

(65) Prior Publication Data
US 2016/0219457 A1 Jul. 28, 2016

Related U.S. Application Data

(60) Provisional application No. 61/990,472, filed on May 8, 2014.

(51) Int. Cl.
*H04W 4/00* (2009.01)
*H04W 28/04* (2009.01)
(Continued)

(52) U.S. Cl.
CPC ........ *H04W 28/048* (2013.01); *H04B 1/1036* (2013.01); *H04B 7/0404* (2013.01);
(Continued)

(58) Field of Classification Search
None
See application file for complete search history.

(56) References Cited

U.S. PATENT DOCUMENTS

2008/0090575 A1* 4/2008 Barak ................ H04W 16/10
455/444
2008/0132281 A1* 6/2008 Kim .................. H04B 7/063
455/562.1
(Continued)

FOREIGN PATENT DOCUMENTS

WO WO 2007/147810 A1 12/2007
WO WO 2013/176589 A1 11/2013

OTHER PUBLICATIONS

International Preliminary Report on Patentability, International Application No. PCT/SE2015/050482, dated Aug. 29, 2016.
(Continued)

*Primary Examiner* — Phirin Sam
(74) *Attorney, Agent, or Firm* — Sage Patent Group

(57) ABSTRACT

A first user equipment is configured to mitigate multi-antenna inter-stream interference. A method by the first UE includes determining, based on one or more criteria, a number of multi-antenna streams whose interference can be currently mitigated by the first UE, and transmitting information based on the number of multi-antenna streams to a first network node, to a second network node, and/or to a second UE. A related method by a first network node serving or managing the first UE includes obtaining information based on a number of multi-antenna streams whose interference can be currently mitigated by a first UE at the first UE, and performing one or more radio operational tasks using the information based on the number of multi-antenna streams whose interference can be currently mitigated.

34 Claims, 13 Drawing Sheets

(51) Int. Cl.

| | | |
|---|---|---|
| *H04B 7/06* | (2006.01) | |
| *H04J 11/00* | (2006.01) | |
| *H04B 1/10* | (2006.01) | |
| *H04L 5/00* | (2006.01) | |
| *H04B 7/0404* | (2017.01) | |
| *H04B 7/0413* | (2017.01) | |
| *H04L 1/18* | (2006.01) | |
| *H04W 72/04* | (2009.01) | |
| *H04B 7/08* | (2006.01) | |

(52) U.S. Cl.
CPC ........... *H04B 7/0413* (2013.01); *H04B 7/063* (2013.01); *H04B 7/0632* (2013.01); *H04B 7/0854* (2013.01); *H04J 11/0036* (2013.01); *H04L 1/1861* (2013.01); *H04L 5/00* (2013.01); *H04W 72/0413* (2013.01)

(56) References Cited

U.S. PATENT DOCUMENTS

| | | | | |
|---|---|---|---|---|
| 2009/0286562 A1* | 11/2009 | Gorokhov | ............ | H04B 7/0617 455/501 |
| 2013/0279617 A1* | 10/2013 | Xu | ....................... | H04B 7/0613 375/267 |
| 2014/0036790 A1* | 2/2014 | Normando | ........... | H04J 11/0033 370/329 |
| 2015/0055630 A1* | 2/2015 | Attar | ................... | H04W 36/245 370/332 |
| 2015/0072627 A1* | 3/2015 | Balasubramanian | .. | H04B 15/02 455/77 |
| 2015/0381335 A1* | 12/2015 | Khojastepour | ....... | H04W 52/14 370/278 |
| 2016/0307087 A1* | 10/2016 | Cruickshanks | .... | G06K 7/10356 |

OTHER PUBLICATIONS

International Search Report for PCT Application No. PCT/SE2015/050482, dated Jul. 14, 2015, 3 pages.

Written Opinion of the International Searching Authority for PCT Application No. PCT/SE2015/050482, dated Jul. 14, 2015, 5 pages.

Performance Requirements of Interference Cancellation and Suppression Receiver for SU-MIMO for E-UTRA, RP-140520, 3GPP TSG RAN Meeting #63, Fukuoka, Japan pp. 1-6, (Mar. 3-6, 2014).

3GPP TS 36.101 V12.3.0, Technical Specification Group Radio Access Network; Evolved Universal Terrestrial Radio Access (E-UTRA); User Equipment (UE) radio transmission and reception (Release 12), pp. 1-510 (Mar. 2014).

3GPP TS 36.213 V12.1.0, Technical Specification Group Radio Access Network; Evolved Universal Terrestrial Radio Access (E-UTRA); Physical layer procedures (Release 12), pp. 1-186 (Mar. 2014).

3GPP TS 25.214 V11.8.0, Technical Specification Group Radio Access Network; Physical layer procedures (FDD) (Release 11), pp. 1-128 (Mar. 2014).

* cited by examiner

Multiple Codeword MIMO Receiver Without Interference Cancellation

Multiple Codeword MIMO Receiver With Interference Cancellation

Throughput Of Single Cell Scenario Under EVA70
Medium Correlation With FRC TM3

Throughput Of Single Cell Scenario Under EVA5 Medium
Correlation With FRC TM4

1 sub-frame

Uplink Feedback Channel Structure
For HSPA/LTE

Transmit a defined value in a first one of CQI1 and CQI2 to signal to the network node that the other one of CQI1 and CQI2 contains a value indicating number of multi-antenna streams (Z) whose interference can be currently mitigated by the first UE — 2000

FIGURE 20

Receive CQ1 and CQI2 values from a first UE — 2100

Determine from a first one of CQI1 and CQI2 containing a defined value that the other one of CQI1 and CQI2 contains a value indicating number of multi-antenna streams (Z) whose interference can be currently mitigated by the first UE — 2102

FIGURE 21

Transmit information to the first network node and/or the second network node indicating a threshold time during which the information remains valid for identifying the number of multi-antenna streams (Z) whose interference can be currently mitigated by the first UE — 2200

FIGURE 22

Receive information from the first UE indicating a threshold time during which the information remains valid for identifying the number of multi-antenna streams (Z) whose interference can be currently mitigated by a first UE — 2300

FIGURE 23

Determine the number of multi-antenna streams (Z) whose interference can be currently mitigated by the first UE based on comparison of CSI values received from the first UE for different multi-antenna streams with respective threshold values. — 2400

FIGURE 24

METHODS TO SIGNAL CURRENT MIMO STREAM INTERFERENCE MITIGATION STATUS

CROSS REFERENCE TO RELATED APPLICATIONS

This application is a 35 U.S.C. §371 national stage application of PCT International Application No. PCT/SE2015/050482, filed on 29 Apr. 2015, which itself claims priority to provisional Application No. 61/990,472, filed 8 May 2014, the disclosure and content of both of which are incorporated by reference herein in their entirety.

TECHNICAL FIELD

The present disclosure is directed to communications and, more particularly, to wireless communication methods, networks, and network nodes.

BACKGROUND

MIMO Background

Multiple Input Multiple Output (MIMO) is an advanced antenna technique to improve the spectral efficiency and thereby boost the Overall system communication capacity. The MIMO technique uses a commonly known notation (M×N) to represent MIMO configuration in terms number of transmit antennas (M) and receive antennas (N). The common MIMO configurations used or currently discussed for various technologies are: (2×1), (1×2), (2×2), (4×2), (8×2) and (2×4), (4×4), (8×4). The configurations represented by (2×1) and (1×2) are special cases of MIMO.

Various embodiments are described herein the context of NodeBs, eNobe Bs, and UEs, this terminology is used herein a non-limiting example manner and does not imply a certain hierarchical relation between the two; in general "NodeB" could be considered as device 1 and "UE" device 2, and these two devices communicate with each other over some radio channel. Although various embodiments are explained in the context of downlink wireless transmissions, the embodiments are also applicable to uplink wireless transmissions.

It is well known that MIMO systems can significantly increase the data carrying capacity of wireless systems. For these reasons, MIMO is an integral part of the 3rd and 4th generation wireless systems. However, for such systems, the optimal maximum-likelihood or Maximum A posteriori Probability (ML/MAP) detection for minimizing the packet error rate using exhaustive search can be impossible or not feasible to implement. This is because a MIMO detector's complexity increases exponentially with the number of transmit antennas or/and the number of bits per constellation point.

Several suboptimal detector structures have been proposed in literature for reducing the complexity of the MIMO detector. These can be classified into linear and nonlinear detectors. Linear detectors include zero-forcing (ZF) and minimum mean-square error (MMSE) detectors, and the nonlinear receivers include decision feedback, nulling-cancelling and variants relying on successive interference cancellation (SIC). These suboptimal detectors are easier to implement but their packet error rate performance is significantly inferior to that of the optimum MIMO detector. This is because most of these sub optimal detection techniques proposed in literature for cancelling multi antenna interference are proposed with/without channel coding and without utilizing the potential of cyclic redundancy check (CRC). However, in a practical system such as LTE/LTE-Advanced, Wimax, HSDPA etc., the CRC bits are appended before the channel encoder at the transmitter and the check has been done after the channel decoder to know whether the packet is received correctly or not.

Interference Cancellation when CRC is Appended

FIG. 1 shows the transmission side of a MIMO communication system with Nt transmit antennas. There are Nt transport blocks. CRC bits are added to each transport block and passed to the channel encoder. The channel encoder adds parity bits to protect the data. Then the stream is passed through an interleaver. The interleaver size is adaptively controlled by puncturing to increase the data rate. The adaptation is done by using the information from the feedback channel, for example channel state information sent by the receiver. The interleaved data is passed through a symbol mapper (modulator). The symbol mapper is also controlled by the adaptive controller. The streams output from modulator are passed through a layer mapper and a precoder. The resultant streams are then passed through IFFT block. The IFFT block is necessary or at least beneficial for some communication systems which implement OFDMA as the access technology, e.g., LTE/LTE-A, Wi-max. For other systems which implement CDMA as the access technology, e.g., HSDPA, the IFFT block is replaced by a spreading/scrambling block. The encoded stream is then transmitted through the respective antenna.

FIG. 2 shows a receiver for a multiple codeword MIMO system without interference cancellation. After the FFT operation, a MIMO detector is used to remove the multi antenna interference. A de-mapper is used to compute bit log likelihood ratios from the MIMO detector output which is in the symbol domain. The bit stream is then de-interleaved by a de-interleaver and passed to a channel decoder for decoding. A CRC check is performed on the output of the channel decoder. If the CRC check passes then transport block is considered to be passed and an ACK is sent back to the transmitter via a feedback channel (also called uplink control channel, HS-DPCCH in HSDPA, and PUCCH/PUSCH in LTE/LTE-A). In contrast, if the CRC check fails then a NAK is sent back to the transmitter using the uplink control channel.

FIG. 3 shows a schematic diagram of a MIMO receiver with an interference cancellation circuit, which concurrently decodes all the receiver codewords. Once the CRC check is made on all the codewords, the codewords whose CRC check is a pass are reconstructed and subtracted from the received signal and only those codewords whose CRC check is a fail are decoded. This process is repeated until all the codewords pass the CRC check, all the codewords fail the CRC check, or a pre-determined number of iterations is reached.

System Level Gains with Interference Cancellation

Table 1 shows example system-level simulation results in the context of 3GPP LTE downlink with 2 and 4 transmit antennas with 2 and 4 multiple code words respectively. These results assume a frequency reuse of one. Synchronous and non-adaptive HARQ with maximum of 4 retransmissions is assumed. Simulations assume Typical Urban (TU) channel model-A with 6 multipath components.

TABLE 1

Relative gains for the Interference Cancellation (IC)

| Config-uration | Sector Throughput (Mbps) | | Cell edge Throughput (Kbps) | | % gain of IC | |
|---|---|---|---|---|---|---|
| | No IC | IC | No IC | IC | Sector Throughput | Cell edge Throughput |
| 2 × 2 | 14.55 | 18.05 | 329 | 338 | 24.05 | 2.75 |
| 4 × 4 | 20.46 | 26.52 | 242 | 375 | 29.62 | 54.96 |

Link Level Gains with Interference Cancellation

FIGS. 4-9 shows example link level gains achieved with interference cancellation for different transmission modes. FIG. 4 illustrates graphs of throughput of a single cell scenario under Extended Vehicular A (EVA) EVA70 medium correlation with Fixed Reference Channel (FRC) TM3. FIG. 5 illustrates graphs of throughput of a single cell scenario under EVA5 medium correlation with FRC TM4. FIG. 6 illustrates graphs of throughput of a single cell scenario under Extended Pedestrian A (EPA) EPA5 medium correlation with FRC TM9. FIG. 7 illustrates graphs of throughput of a multi-cell scenario under EVA70 medium correlation with FRC TM3. FIG. 8 illustrates graphs of throughput of a multi-cell scenario under EVA5 medium correlation with FRC TM4. FIG. 9 illustrates graphs of throughput of a multi-cell scenario under EVA5 medium correlation with FRC TM9.

It can be observed that significant gains can be achieved in almost all cases simulated, including single cell scenarios and multi-cell scenarios. Two types of interference cancellation receivers are considered, namely symbol level interference cancellation (SLIC) 404, 504, 604, 704, 804, 904 and codeword level interference cancellation (CWIC) 402, 502, 602, 702, 802, 902 receivers. A SLIC type of receiver cancels the interference based on a modulation symbol level, utilizing successive application of linear detection, reconstruction, and cancellation. A CWIC type of receiver cancels the interference based on a decoded codeword level which is taken as a non-linear receiver that decodes and subtracts the interference. CWIC requires more computations and is more complex to implement. The performance of CWIC is better than SLIC.

Uplink Feedback Channel

FIG. 10 shows the uplink feedback channel structure in HSPA/LTE. Where the Hybrid Automatic Repeat Request-Acknowledgement (HARQ-ACK) is transmitted corresponding to the data traffic channel and the channel state information (CSI) is transmitted in the next slot. Note that CSI may consist of channel quality indicator (CQI), precoding matrix index (PMI)/Precoding control index (PCI), rank information (RI)/number of transport blocks preferred (NTBP) and preferred sub band indices.

Problems With Existing Solutions

When the UE performs interference cancellation (IC), the network node (e.g. Node B in HSPA or eNode B in LTE) does not know whether the UE is able to suppress the inter-stream interference at any instance. For example the UE may switch off the IC or reduce the IC capacity (partial IC) in some scenarios. In these cases, since the network node does not know the status of UE IC capability the radio resources at the network node may be wasted or are under-utilized.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a method by a first user equipment (UE) that is configured to mitigate multi-antenna inter-stream interference. The method includes determining, based on one or more criteria, a number of multi-antenna streams Z whose interference can be currently mitigated by the first UE. The method further includes transmitting information based on the number of multi-antenna streams Z to a first network node, to a second network node, and/or to a second UE.

Because the network node (e.g. Node B in HSPA or eNode B in LTE) knows the number of multi-antenna streams whose interference the first UE is able to suppress at any instance, the network node can configure its radio resources when communicating with the first UE to more efficiently use those radio resources and to reduce communication losses with the first UE. For example, the network node can adapt the number of multi-antenna streams it transmits to the first UE depending upon the number of multi-antenna streams whose interference can be currently mitigated by the UE.

Some related embodiments of the present disclosure are directed to a method by a first network node serving or managing a first UE configured to mitigate multi-antenna inter-stream interference. The method includes obtaining information based on a number of multi-antenna streams Z whose interference can be currently mitigated by a first UE at the first UE, and performing one or more radio operational tasks using the information based on the number of multi-antenna streams Z whose interference can be currently mitigated by a first UE at the first UE.

Related user equipment and network nodes are disclosed. Other methods, user equipment, and network nodes according to embodiments of the invention will be apparent to one with skill in the art upon review of the following drawings and detailed description. It is intended that all such additional methods, user equipment, and network nodes be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 11, 13-20, and 22 illustrate flowcharts of operations and methods that are performed by a UE according to some embodiments;

FIGS. 12, 21, 23, and 24 illustrate flowcharts of operations and methods that are performed by a network node according to some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Although various embodiments are disclosed herein in the context of being performed by a UE and/or a network node, they are not limited thereto and instead can be performed in any type of electronic communication device or system.

Figure 1:
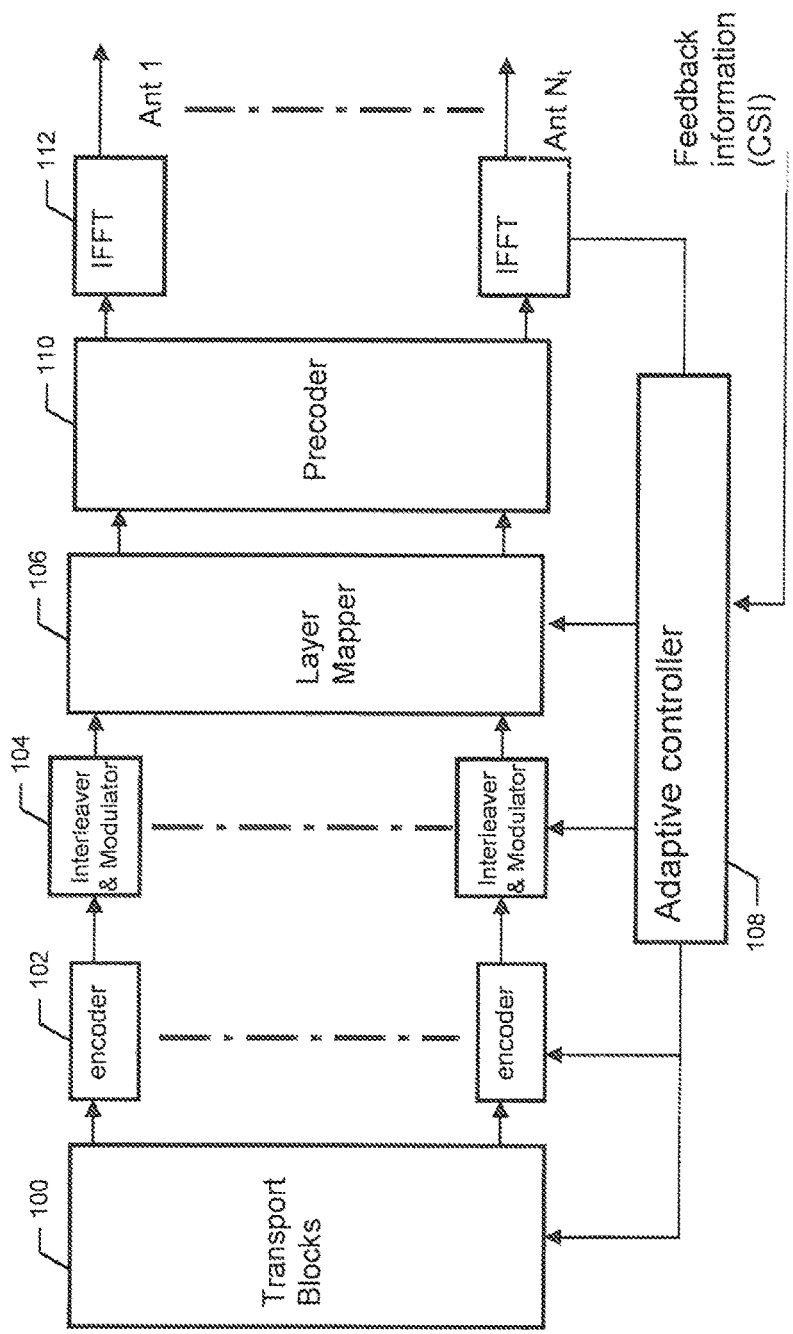
FIG. 1 is a schematic diagram of a multiple codeword MIMO transmitter.
Figure 2:
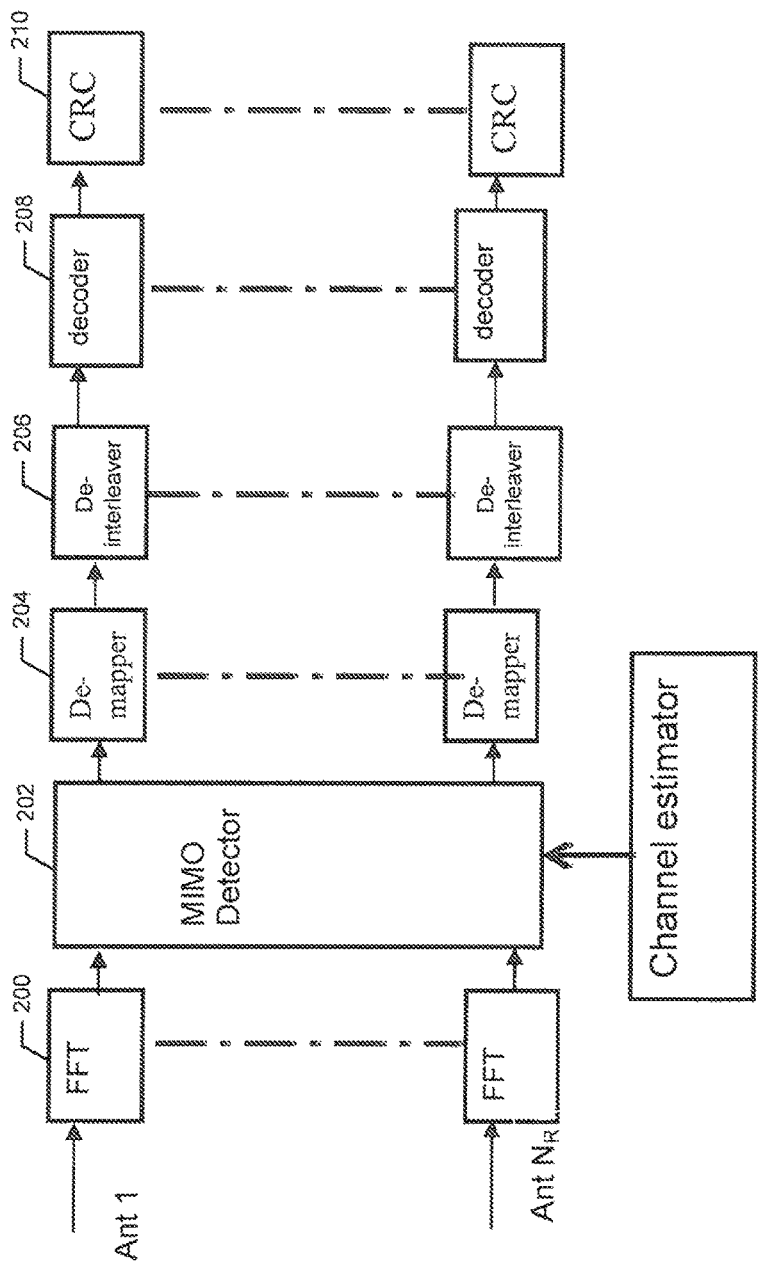
FIG. 2 is a schematic diagram of a multiple codeword MIMO receiver without interference cancellation.
Figure 3:
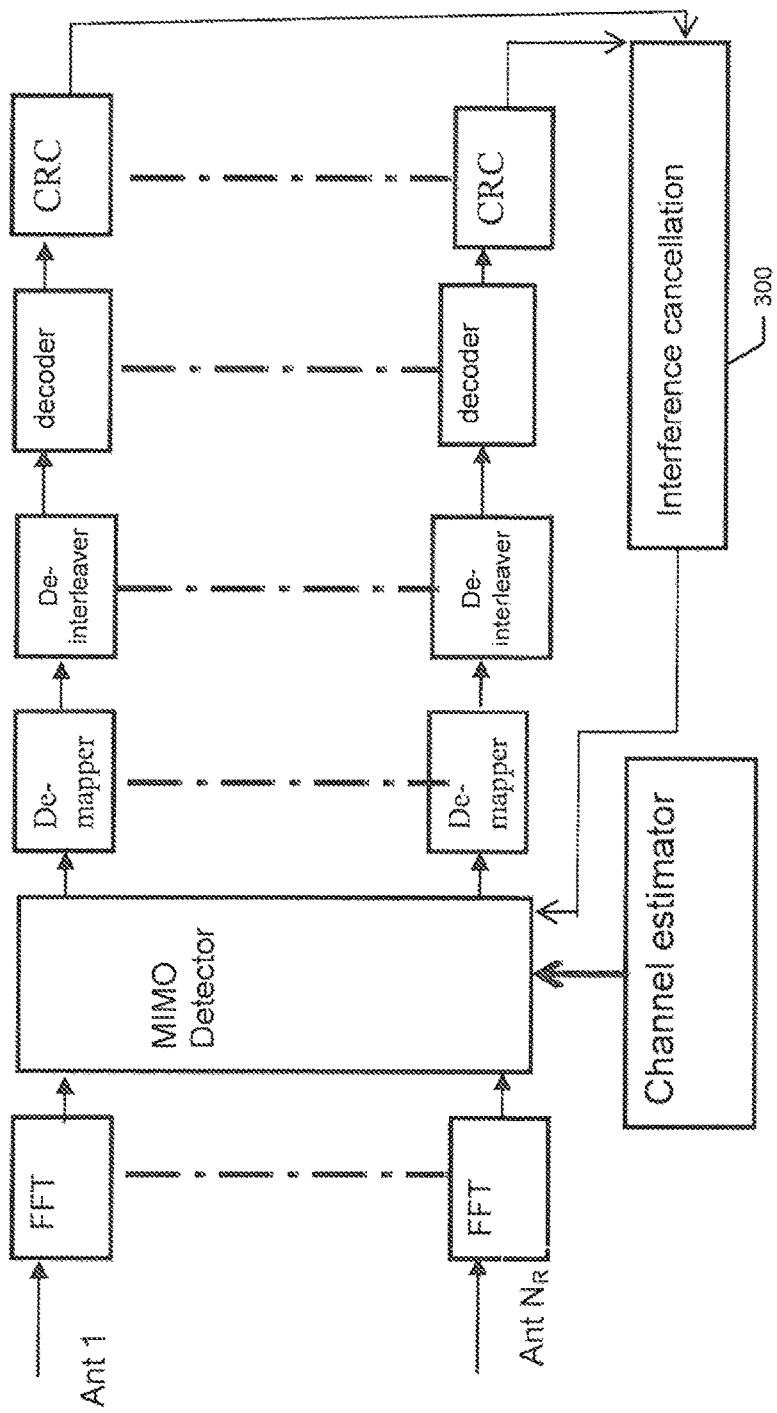
FIG. 3 is a schematic diagram of a multiple codeword MIMO receiver with interference cancellation according to some embodiments.
Figure 4:
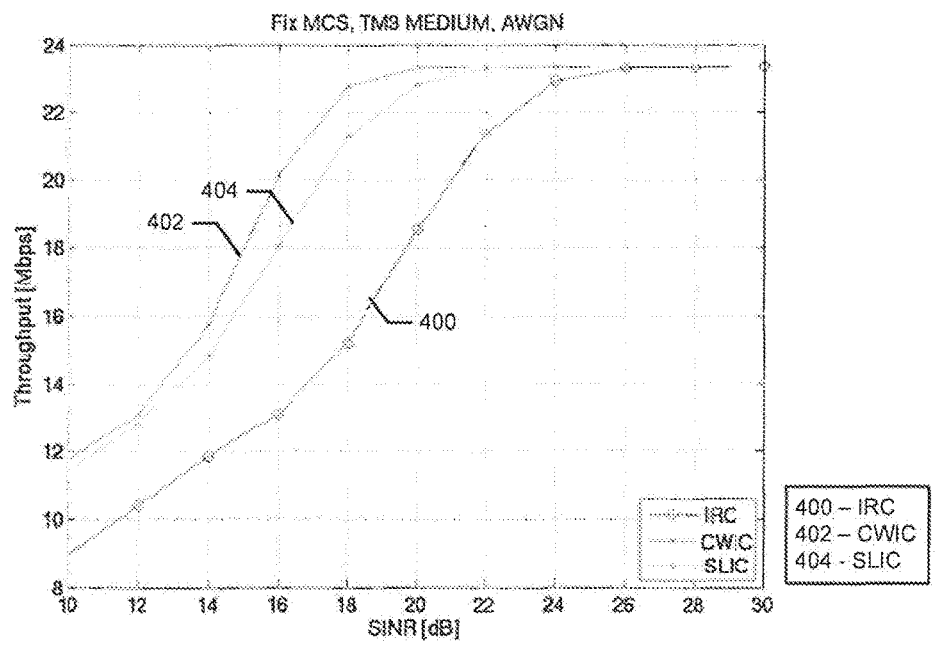
FIG. 4 illustrates graphs of throughput of a single cell scenario under EVA70 medium correlation with FRC TM3.
Figure 5:
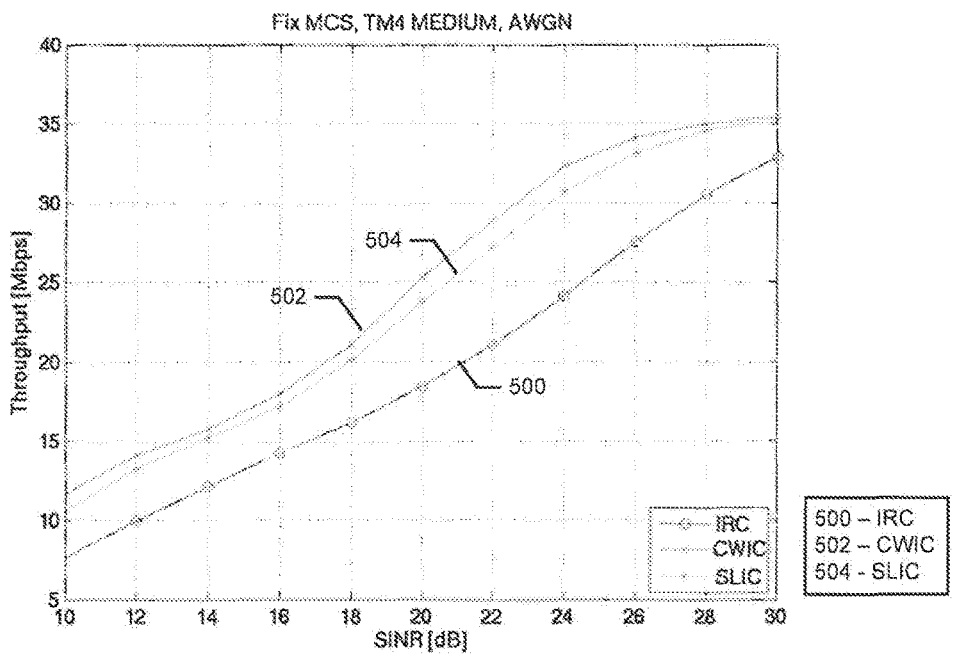
FIG. 5 illustrates graphs of throughput of a single cell scenario under EVA5 medium correlation with FRC TM4.
Figure 6:
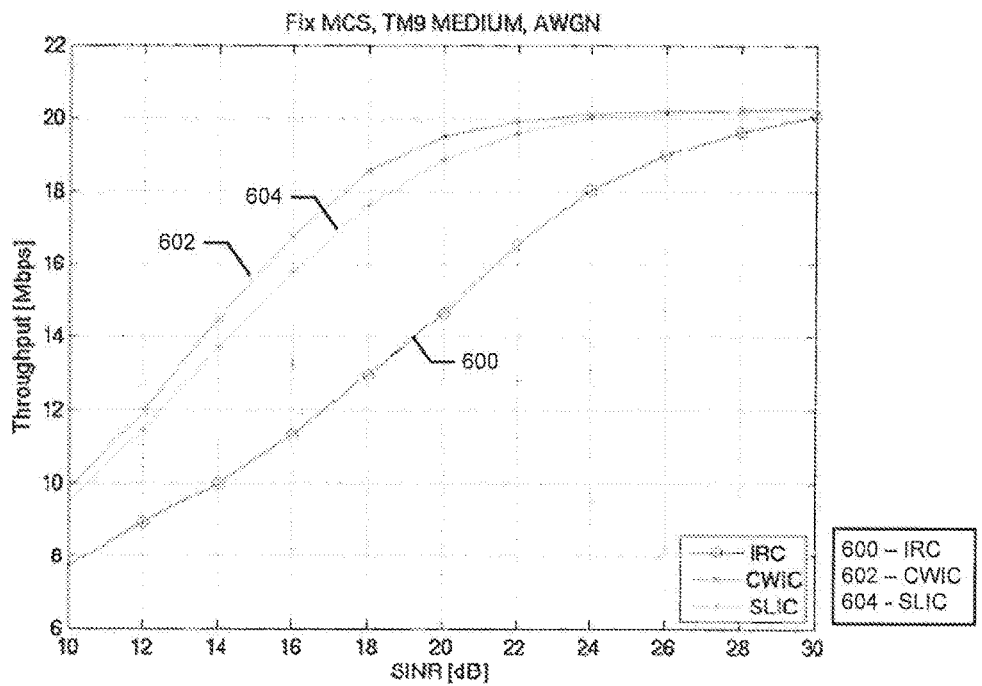
FIG. 6 illustrates graphs of throughput of a single cell scenario under EPA5 medium correlation with FRC TM9.
Figure 7:
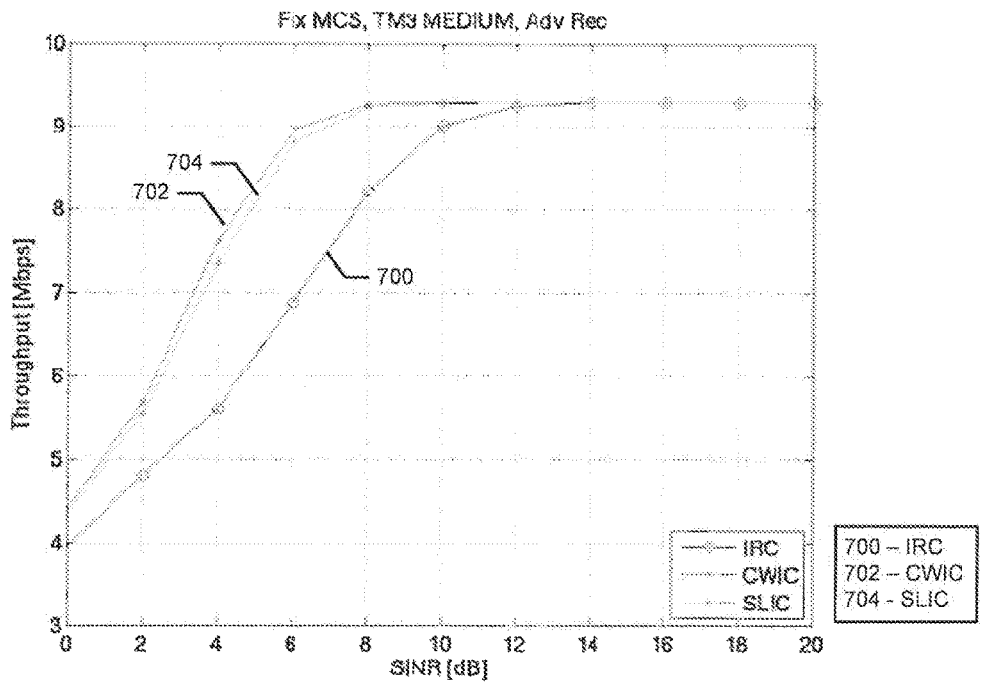
FIG. 7 illustrates graphs of throughput of a multi-cell scenario under EVA70 medium correlation with FRC TM3.
Figure 8:
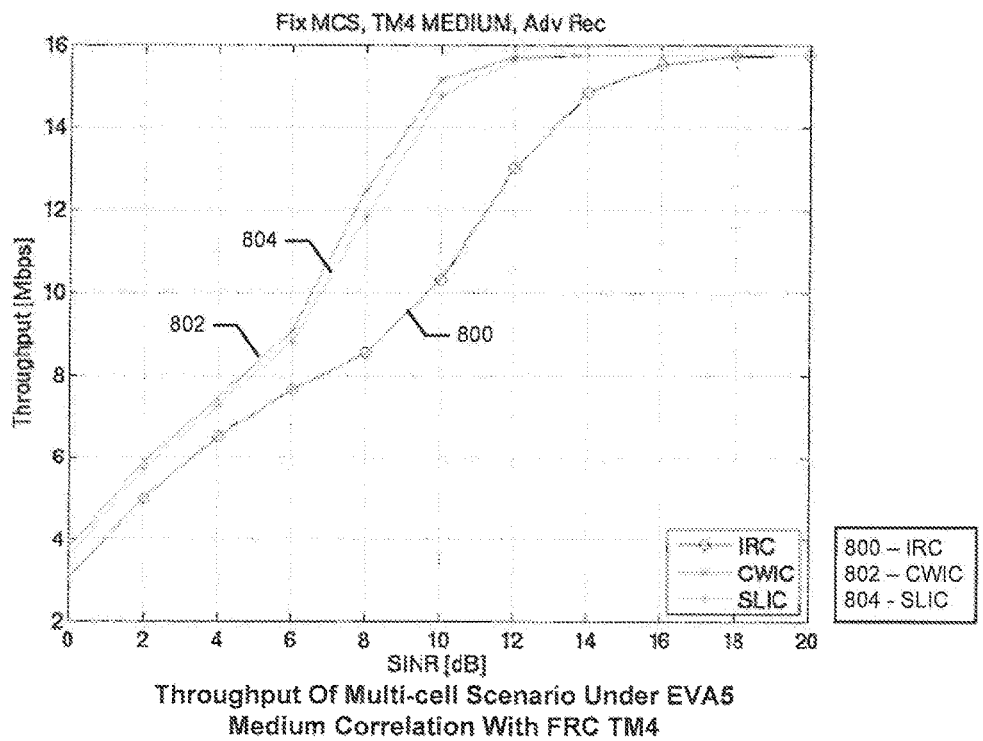
FIG. 8 illustrates graphs of throughput of a multi-cell scenario under EVA5 medium correlation with FRC TM4.
Figure 9:
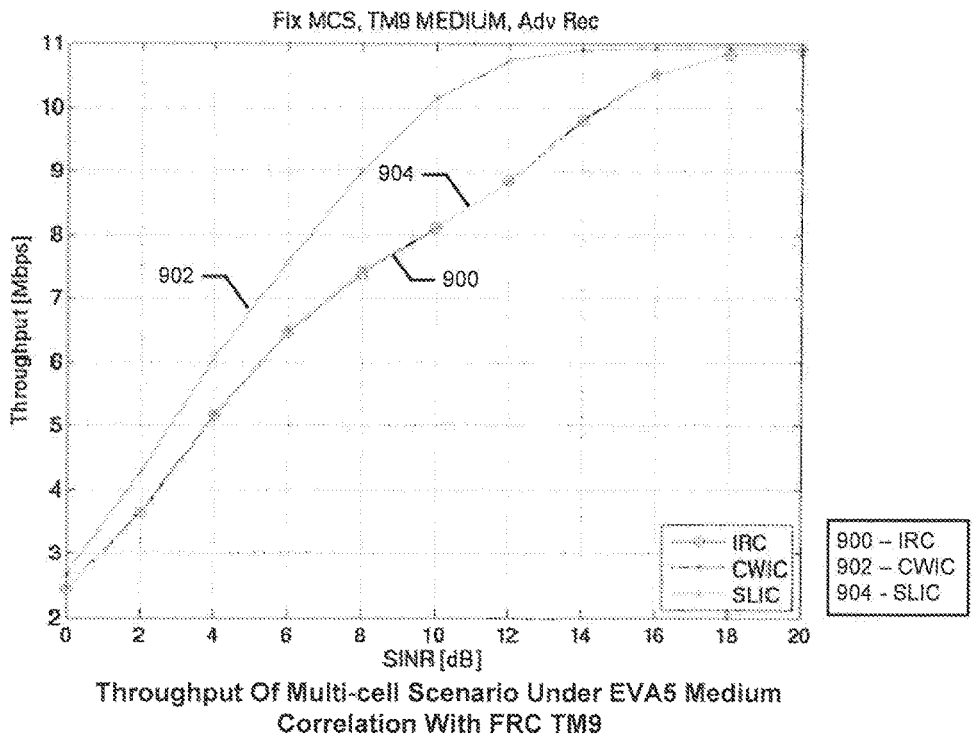
FIG. 9 illustrates graphs of throughput of a multi-cell scenario under EVA5 medium correlation with FRC TM9.
Figure 10:
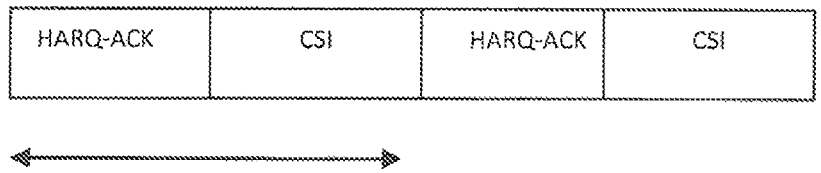
FIG. 10 illustrates an uplink feedback channel structure for HSPA/LTE.
Figure 11:
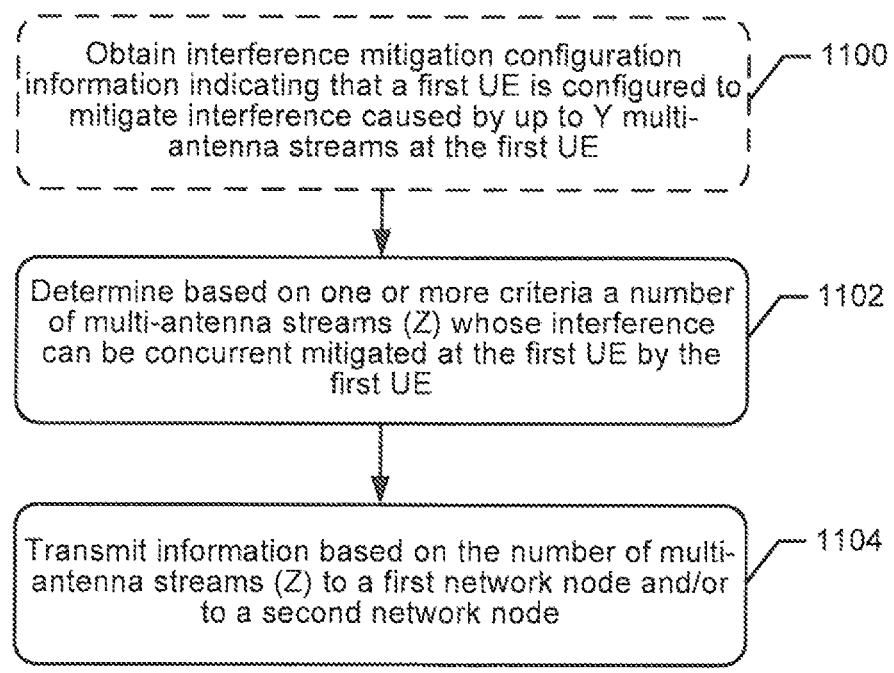

One embodiment is directed to a method in a first UE configured to mitigate multi-antenna stream interference. FIG. 11 illustrates is a flowchart of the method that can include obtaining (block 1100) interference mitigation configuration information indicating that the first UE is configured to mitigate interference caused by up to (Y) multi-antenna streams received at the first UE.

The interference mitigation configuration information may indicate for each of a plurality of different communication channels (e.g., time and/or frequency based transmission channels), up to how many (Y) multi-antenna streams the first UE is configured to mitigate interference from. The interference mitigation configuration information may include a listing of channels that are usable by the first UE for communication and the associated number (Y) multi-antenna streams the first UE is configured to mitigate interference from.

The first UE may transmit the interference mitigation configuration information to a first network node and/or to a second network node during call setup or registration process.

The obtaining (block 1100) step is optional because it does not need to be an express step performed by the first UE during operation. For example, the first UE may be devoid of any operations or methods for obtaining the interference mitigation configuration information when the first UE is otherwise configured during manufacture and/or initial setup based on knowledge of the interference mitigation configuration information.

The method includes determining (block 1102), based on one or more defined criteria, a number of multi-antenna streams (Z) whose interference can currently be mitigated at the first UE by the first UE. The first UE may determine (block 1102) the number of multi-antenna streams (Z) for each of a plurality of different communication channels (e.g., time and/or frequency based transmission channels). The first UE may generate a listing of the channels and the associated number of multi-antenna streams (Z) whose interference can currently be mitigated at the first UE.

The method further includes transmitting (block 1104) information based on the number of multi-antenna streams (Z) to a first network node, to a second network node, and/or to another UE (e.g., device to device (D2D) communications). The information may contain a value for the number of multi-antenna streams (Z) or otherwise indicate the number of multi-antenna streams (Z). The transmission may indicate for each of a plurality of different communication channels the number of multi-antenna streams (Z), at the respective one of the communication channels, whose interference can currently be mitigated. Thus, the first UE may transmit information that indicates the listing of channels and associated number of multi-antenna streams (Z).

Figure 12:
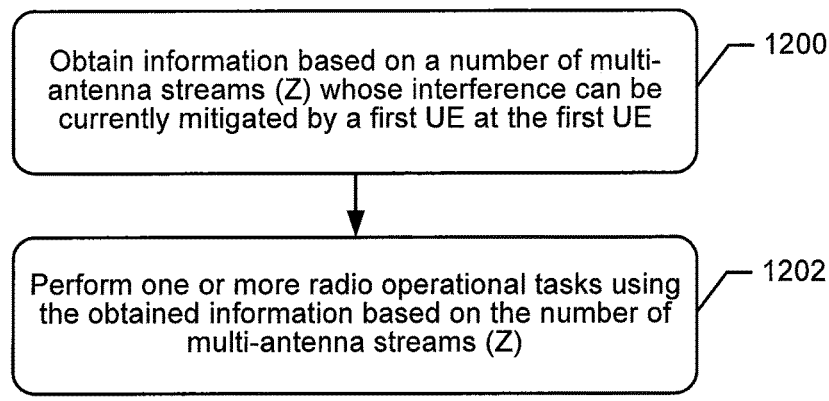

Another embodiment is directed to a method in a first network node and/or a second network node serving or managing a first UE configured to mitigate multi-antenna stream interference. FIG. 12 illustrates is a flowchart of the method that can include obtaining (block 1200) information based on a number of multi-antenna streams (Z) whose interference can be currently mitigated by a first UE at the first UE. The information may indicate a present status of the first UE's multi-antenna inter-stream interference mitigation capability.

As explained above with respect to a possible transmission (block 1104) by a first UE, the network node and/or the other UE can receive from the first UE information that indicates for each of a plurality of different communication channels the number of multi-antenna streams (Z), at the respective one of the communication channels, whose interference can currently be mitigated. The received information may indicate a listing of channels and associated number of multi-antenna streams (Z).

The method further includes performing (block 1202) one or more radio operational tasks using the obtained information based on the number of multi-antenna streams (Z). The one or more radio operational tasks performed by the first network node and/or the second network node using the obtained information may include adapting a communication link with the first UE, configuring multi-antenna receiver operations of the first UE, and/or configuring transmissions to other network nodes. The radio operational tasks can be performed separately on different channels based on the information indicating for the respective channels how many multi-antenna streams (Z) the first UE can currently operate to mitigate interference from.

Potential Advantages of these and Other Embodiments

The following advantages may be provided by one or more of the embodiments disclosed herein.
1) Link adaptation can be controlled by a network node to reduce or minimize communication losses with UEs.
2) The network node can adapt a configuration of the number of multi-antenna streams transmitted by a network node to a UE depending upon the number of multi-antenna streams whose interference can be currently mitigated by the UE.
3) The network node can adjust what radio communication resources it utilizes based on the current status of multi-antenna inter-stream interference mitigation capability of one or more UEs. For example more multi-antenna resources (streams) can be allocated to a UE which can currently mitigate interference from a larger number of streams.

1 Generalization and Description of Scenarios for Multi-Antenna Inter-Stream Interference Mitigation In some embodiments the non-limiting term radio network node or simply network node is used and it refers to any type of network node serving a UE and/or connected to another network node or network element or any radio node from which a UE receives a signal. Examples of radio network nodes include, but are not limited to, Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used and it refers to any type of wireless device communicating with a radio network node in a cellular or mobile communication system. Examples of a UE are any target device, device to device (D2D) UE, machine type UE or UE capable of machine to machine (M2M) communication, PDA, iPAD, Tablet, mobile terminals, smart phone, laptop embedded equipment (LEE), laptop mounted equipment (LME), USB dongles etc.

Various embodiments are described in the context of MIMO operation UTRA/HSPA. The embodiments are however applicable to any RAT or multi-RAT system where the UE operates using MIMO, e.g. LTE FD/TDD, GSM/GERAN, WiFi, WLAN, WiMax, CDMA2000 etc.

The embodiments are applicable to single carrier as well as to multicarrier (MC) or carrier aggregation (CA) operation of the UE in conjunction with MIMO in which the UE is able to receive and/or transmit data to more than one serving cell using MIMO. The term carrier aggregation (CA) is also interchangeably called "multi-carrier system", "multi-cell operation", "multi-carrier operation", and "multi-carrier" transmission and/or reception.

The phrases interference mitigation receiver, interference cancellation receiver, interference suppression receiver, interference rejection receiver, interference aware receiver, interference avoidance receiver, or any combination thereof are interchangeably used but they all belong to a category of an advanced receiver or an enhanced receiver. Interference cancellation or suppression by such advanced receiver structures can lead to the elimination of the interference, in which case the interference is completely cancelled, whereas in other cases the impact of interference on the useful signal is reduced. In various embodiments the phrase "interference mitigation" refers to the receiver's ability to mitigate the interference caused by at least some signals received at the UE receiver on at least one multi-antenna stream (aka MIMO stream, MIMO layer, multi-antenna layer, etc). This is also referred to as a inter-stream interference mitigation technique.

Example signals whose interference may be mitigated according to various embodiments disclosed herein include, Physical Downlink Shared Channel (PDSCH), Physical Downlink Control Channel (PDCCH), Physical control format indicator channel (PCFICH), Physical Broadcast Channel (PBCH), etc. For example the UE may be configured with 2 multi-antenna streams (first and second streams) for signal reception by the network node and in which case the signals of the second stream may cause interference at the UE when receiving the signals on the first stream and vice versa. The multi-antenna stream whose interference is mitigated may or may not belong to the UE that performs inference mitigation. Therefore there are several variants or types of such interference mitigation technique according to some embodiments as explained below:

1. In one embodiment, a first UE mitigates inter-stream interference of its own multi-antenna stream(s), also referred to as intra-UE inter-stream interference mitigation and/or Single User (SU)-MIMO inter-stream interference mitigation.
2. In another embodiment, the first UE mitigates inter-stream interference of multi-antenna stream(s) of other UE(s) (e.g. at least a second UE), also referred to as inter-UE inter-stream interference mitigation and/or MU-MIMO inter-stream interference mitigation.
3. In another embodiment for MU-MIMO inter-stream interference mitigation, the first UE mitigates inter-stream interference caused by other UEs (interference from at least a second UE) in its own (serving cell of the UE). This approach is also called intra-cell MU-MIMO inter-stream interference mitigation.
4. In another embodiment, the first UE mitigates inter-stream interference caused by other UEs (e.g. a third UE) in one or more neighboring cells, also called interfering cells, aggressor cells, dominant cells, etc. This approach is also called inter-cell MU-MIMO inter-stream interference mitigation.
5. Still other embodiments included combinations of one or more of the above numbered embodiments for inter-stream interference mitigation.

The receiver can mitigate multi-antenna inter-stream interference using one or more processes that can include maximum likelihood (ML) with full blown search, R-ML (reduced complex ML), code word interference cancellation (CWIC), and/or symbol level IC (SLIC).

The first UE may be served by a first network node (e.g. base station) and/or also by a second network node (e.g. Radio Network Controller (RNC) in High Speed Packet Access (HSPA)). For example first and second network nodes can be Node B and RNC respectively in HSPA. In some embodiments the first and the second network nodes may be the same, e.g. eNode B in LTE. The first network node and the second network node can be synchronous or asynchronous in time.

2 Method in UE of Indicating Multi-Antenna Inter-Stream Interference Mitigation Restriction In this embodiment a first UE determines (block 1100) the current number of multi-antenna inter-streams whose interference can be mitigated by the first UE and indicates the associated information to a first network node, to a second network node, and/or to another UE. The other UE can be a second UE and/or a third UE. For example if the first and the other UE are capable of Device to Device (D2D) operation then the first UE can transmit the information to the other UE. A UE capable of D2D operation (aka D2D UE) can receive signals directly from and/or transmit signals directly to another D2D UE, without relay through another device such as a base station or router. The D2D operation is also interchangeably called D2D communication, D2D transmission, D2D reception, and D2D discovery. As explained with regard to FIG. 11, the steps performed by the first UE can include:

- Obtaining UE capability of multi-antenna inter-stream interference mitigation (optional), (block 1100);
- Determining current number of multi-antenna inter-streams for mitigating interference, (block 1102); and
- Transmitting current number of multi-antenna inter-streams for mitigating interference to network node, (block 1104).

Figure 13:
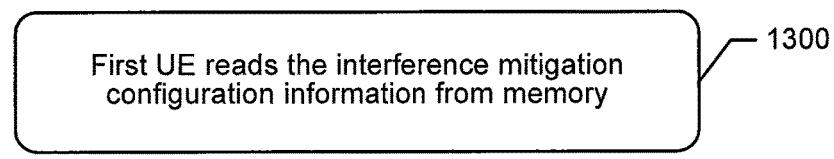

The above steps are elaborated below:

2.2.1 Obtaining UE Capability of Multi-Antenna Inter-Stream Interference Mitigation In this step (block 1100) the first UE determines its capability related to the mitigation of multi-antenna inter-stream interference, also referred to as interference mitigation configuration information. If the first UE has such inter-stream interference mitigation capability then the interference mitigation configuration information for each communication carrier usable by the first UE may also be stored in its memory. Referring to the embodiment of FIG. 13, the first UE reads (1300) interference mitigation configuration information from a memory device indicating that the first UE is configured to mitigate interference caused by up to Y multi-antenna streams at the first UE. The information may also contain additional information such as the maximum number of multi-antenna inter-streams (X) for each of a plurality of carriers, which the first UE can mitigate. The additional information may further comprise of the type(s) or variant(s) of the multi-antenna inter-stream interference technique(s) which are supported by the first UE. The first UE may further determine the configured maximum number of multi-antenna inter-streams (Y) for per carrier whose interference is to be mitigated, where $Y \leq X$.

Figure 14:
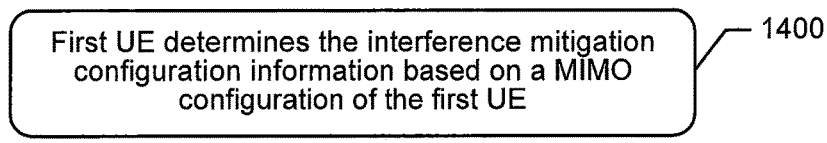

The configured value (Y) can be determined implicitly (e.g. based on MIMO configuration) or based on explicit indication or configuration received from the first network node. For example if the first UE supports 4×4 MIMO and is also configured with 4×4 MIMO then it can mitigate interference caused by up to 3 multi-antenna streams. But if the first UE is configured to operate with 4×2 then it may mitigate interference caused by only for 1 multi-antenna stream. In the embodiment of FIG. 14, the first UE determines (1400) the interference mitigation configuration information, indicating that the first UE is configured to mitigate interference caused by up to Y multi-antenna streams at the first UE, based on a MIMO configuration of the first UE. Thus, the first UE can determine (1400) the interference mitigation configuration information based on a MIMO circuit configuration of the first UE.

The first UE may transmit the interference mitigation configuration information to a first network node and/or to a second network node during call setup or registration process.

The parameter X or Y for per carrier may correspond to intra-UE streams (i.e. first UE's own streams), intra-cell inter-UE streams of at least the second UE (i.e. for UEs within first UE's serving cell), inter-cell inter-UE streams of at least the third UE (i.e. for UEs within first UE's neighboring cell) or any combination thereof.

2.1.2 Determining Current Number of Multi-Antenna Inter-Streams for Mitigating Interference The first UE operate to use one or more criteria to determine, for example, a maximum number of multi-antenna streams (Z) for per carrier whose interference at the first UE can be currently mitigated by the first UE, where $Z \leq Y$. The term current herein can mean the value of Z for per carrier which may be applicable for at least one time unit (e.g. TTI, subframe, scheduling instance, frame etc) starting from a reference time. The reference time may be the current subframe, frame, reporting instance of control channel in UL by the first UE etc.

The first UE continuously evaluate one or more criteria, and if conditions are conducive then the first UE may also restore partly or fully the number of streams for interference mitigation up to their configured value, i.e. Y for per carrier.

Examples of criteria used by the first UE for determining the parameter Z for per carrier are described below:

2.1.2.1 UE Battery Life and Power Consumption

Figure 15:
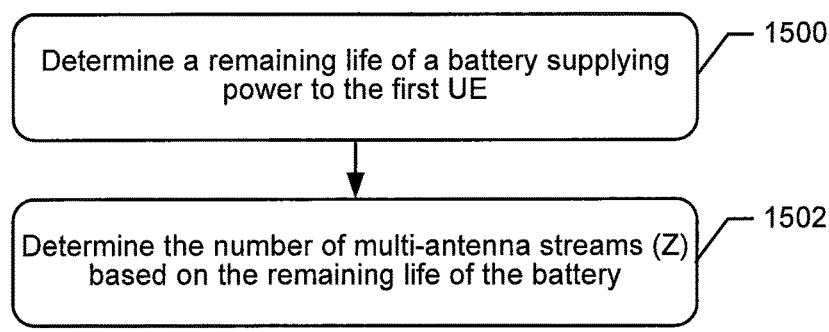

The mitigation of interference of larger number of multi-antenna inter-streams can drain the UE battery life. If the UE battery is below a threshold then the first UE may decide to restrict the number of multi-antenna inter-streams whose interference it will mitigate. Referring to FIG. 15, the UE can determine (block 1500) a remaining life of a battery supplying power to the first UE, and determine (block 1502) the number of multi-antenna streams (Z) based on the remaining life of the battery.

The first UE may determine (block 1502) the number of multi-antenna streams (Z) for each of a plurality of different communication channels.

2.1.2.2 Additional Ongoing Interference Mitigation

The first UE may be capable of mitigating additional types of interference, e.g. interference caused by reference signal (CRS IM), control channels (e.g. PDCCH IC) etc. The first UE may limit the number of multi-antenna inter-streams for mitigating their interference to a lower number in case the UE is also mitigating one or more additional types of interference using other IM receivers, e.g. CRS IM, PDCCH IC etc. In this way the first UE may reduce complexity.

Figure 16:
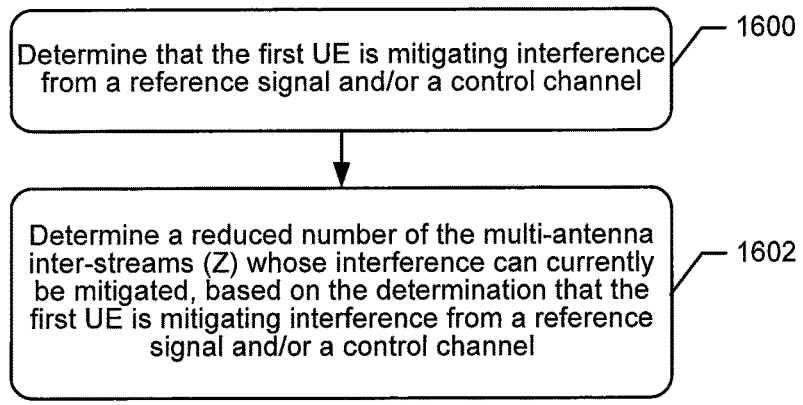

In the embodiment of FIG. 16, the first UE determines (block 1102 of FIG. 11) a number of multi-antenna streams (Z) whose interference can currently be mitigated at the first UE by the first UE, by the method of: determining (block 1600) that the first UE is mitigating interference from a reference signal and/or a control channel, and determining (block 1602) a reduced number of the multi-antenna inter-streams (Z) whose interference can currently be mitigated at the first UE by the first UE based on the determination that the first UE is mitigating interference from a reference signal and/or a control channel.

2.1.2.3 Strength or Signal Quality of Multi-Antenna Inter-Streams

The first UE may decide to mitigate interference only for those streams which are sufficiently strong, e.g. whose signal quality is above a threshold. This is because the substantial performance gain is achieved by mitigating stronger streams. This approach may also reduced implementation complexity. Examples of signal quality are SINR, SNR, BLER etc.

Figure 17:
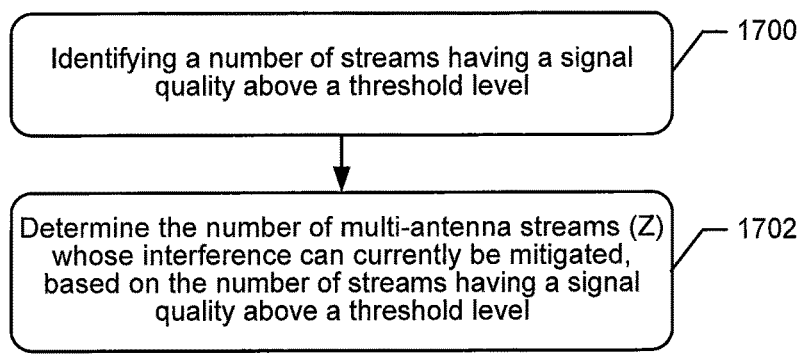

In the embodiment of FIG. 17, the first UE determines (block 1102 of FIG. 11) a number of multi-antenna streams (Z) whose interference can currently be mitigated at the first UE by the first UE, by the operations and method of: identifying (block 1700) a number of streams having a signal quality above a threshold level, and determining (block 1702) the number of multi-antenna streams (Z) whose interference can currently be mitigated based on the number of streams having a signal quality above a threshold level.

2.1.2.4 Priority for Limiting Different Types of Multi-Antenna Inter-Streams for Interference Mitigation The first UE may decide to limit the maximum number of streams for only certain type of inter-stream interference mitigation e.g. only for multi-user MIMO (MU-MIMO) inter-stream interference mitigation. The first UE may also decide to initially limit the maximum number of streams for a defined type of inter-stream interference mitigation, and then later apply the restriction for another type of inter-stream interference mitigation (e.g. intra-UE inter-stream interference mitigation). The first UE may apply such restriction based on a pre-defined rule, autonomous decision or based on configuration performed by the first network node.

Figure 18:
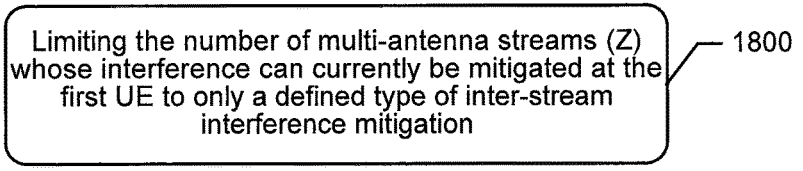

In the embodiment of FIG. 18, the first UE determines (block 1102 of FIG. 11) a number of multi-antenna streams (Z) whose interference can currently be mitigated at the first UE by the first UE, based on limiting (block 1800) the number of multi-antenna streams (Z) whose interference can currently be mitigated at the first UE to only a defined type of inter-stream interference mitigation. The defined type may be one of MU-MIMO inter-stream interference mitigation and intra-UE inter-stream interference mitigation.

2.1.2.5 Deployment of CA Capability and/or Number of Carriers the UE is Receiving When under CA deployment, the first UE may decide to limit the maximum number of carriers on which certain type of inter-stream interference mitigation is implemented. The first UE may also decide to initially limit the maximum number of streams for certain type of inter-stream interference mitigation on certain carrier/carriers, e.g., PCell or SCell.

Figure 19:
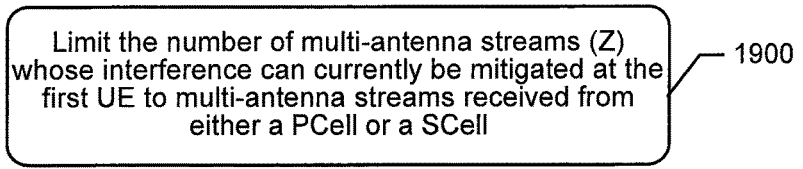

In the embodiment of FIG. 19, the first UE determines (block 1102 of FIG. 11) a number of multi-antenna streams (Z) whose interference can currently be mitigated at the first UE by the first UE, based on limiting (block 1900) the number of multi-antenna streams (Z) whose interference can currently be mitigated at the first UE to multi-antenna streams received from either a PCell or a SCell.

2.1.2.6 Combination of Criteria

The first UE may use any combination of the criteria explained above to decide whether to restrict the number of multi-antenna inter-streams to a lower number than a maximum configured value for mitigating their interference, or not and to what extent. For example the first UE may limit the maximum number of streams for interference mitigation to a lower value provided battery power is below a threshold and signal quality of at least one multi-antenna stream is below a threshold.

2.1.3 Transmitting Current Number of Multi-Antenna Inter-Streams for Mitigating Interference to Network Node In some embodiments, the first UE transmits information based on the number of multi-antenna streams (Z) (e.g., as determined in section 2.1.2) to one or more network nodes (e.g. first network node and/or second network node). The first UE may also transmit information based on the number of multi-antenna streams (Z) for each of a plurality of different carriers, in case the first UE applies restriction on the number of streams for more than one type of multi-antenna interference mitigation techniques.

Various aspects related to the reporting of the information are described below:

2.1.3.1 Reporting Mechanisms

In one aspect of this embodiment the first UE may transmit the information based on the number of multi-antenna streams (Z) proactively or autonomously whenever the first UE determines any change in the number of multi-antenna streams (Z) or the first UE may report the information periodically or whenever the first UE sends uplink feedback information (e.g. HARQ feedback, measurement report etc). In another aspect of this embodiment the first UE may report the information upon receiving a request from the first or the second network node to transmit the information. In yet another aspect of this embodiment the first UE may be requested by the first or the second network node to report information only if there is any change in the value of the number of multi-antenna streams (Z) for one of carriers relative to a previously determined number of multi-antenna streams (Z) for that carrier.

The first UE may report the information based on the number of multi-antenna streams (Z) by using one or more of the following mechanisms:

In a first type of reporting mechanism, the first UE may transmit the information in a higher layer signaling such as via a Radio Resource Control (RRC) message to the first network node or to the second network node. The information may alternatively or additionally be reported in a Media Access Control (MAC) message.

In a second type of reporting mechanism, the first UE may alternatively or additionally use the unused bits or code words or fields or control space or bit pattern or bit combinations (aka, spared, reserved, redundant bits or code words or control space or bit pattern or bit combinations etc) for transmitting the information to indicate a number of multi-antenna streams (Z) for each of a plurality of carriers to the first or the second network node. Typically using this mechanism the first UE sends the information to the first network node (e.g. to the serving base station). The unused bits herein means any set of available bits in an uplink control channel that are not used by the UE to indicate any uplink transmission parameters, e.g. bits that are not used for indicating uplink feedback information such as CSI related information, HARQ feedback (ACK/NACK), and modulation.

Some operations and methods that may be performed by the first UE to transmit this information using the unused bits are described in the context of the following example embodiments.

2.1.3.1.1 Using Unused Combinations of CQI

In HSDPA, when the UE is configured in MIMO mode the UE needs to indicate the Channel Quality Indicator (CQI) quality of each HARQ process identifier (HARQ id). In the current 3GPP standard, 8 bits are allocated for reporting CQI. Each HARQ-process identifier uses 4 bits for reporting CQI, hence in total 16 combinations are possible, however the standards allow only 15 possibilities, hence one unused combination per each HARQ-id can be used to indicate the current interference cancellation capability of the UE receiver.

For example when the 2 branch MIMO is used the following combinations can be used by the first UE as shown in table 2 below.

| CQI1 | CQI2 | Purpose |
| --- | --- | --- |
| 11111 | Any used combination | Inter-stream interference mitigation is on |
| Any used combination | 11111 | Inter-stream interference mitigation is off |

Referring to the embodiment of FIG. 20 and as shown in table 2, the first UE can transmit (block 2000) a defined value (e.g., bit pattern such as "11111") in a first one of CQI1 and CQI2 to signal to the network node that the other one of CQI1 and CQI2 contains a value indicating number of multi-antenna streams (Z) whose interference can be currently mitigated by the first UE, and may contain a plurality of values generated based on the number of number of multi-antenna streams (Z) whose interference can be currently mitigated by the first UE for each of a plurality of different channels.

In a corresponding manner, a network node can operate according to the embodiment of FIG. 21 to receive (block 2100) CQI1 and CQI2 values from the first UE, and determine (block 2102) from a first one of CQI1 and CQI2 containing a defined value (e.g., bit pattern such as "11111") that the other one of CQI1 and CQI2 contains a value generated based on the number of multi-antenna streams (Z) whose interference can be currently mitigated by the first UE.

When the UE is configured in MIMO mode with four transmit antennas, it can use the following combinations to indicate the current interference mitigation capability to the first network node as shown in table 3 below.

| CQI1 | CQI2 | Purpose |
| --- | --- | --- |
| 11111 | Any used combination | Inter-stream interference mitigation is limited to 3 streams by UE |
| Any used combination | 11111 | Inter-stream interference mitigation is limited to 2 streams by UE |
| 11111 | 11111 | Inter-stream interference mitigation is limited to 1 stream by UE |
| Unused combination | Unused combination | Inter-stream interference mitigation is off by UE |

In LTE there is more flexibility to deploy bits used for Channel Quality Indicator (CQI) reporting. When using a type 2 format for Physical Uplink Control Channel (PUCCH) reporting, the payload size for wideband CQI/PMI has maximum 11 bits for 4 antenna ports with rank >1. When 2 antenna ports RI=1 there are 6 bits required for wideband CQI/PMI so 5 bits left in which 1 bit to indicate the antenna number if it's 2 or 4 and 1 bit to indicate the rank if it's rank 1 or rank >1. There are 3 bits left unused and can be used for indication of number of received antenna for mitigation of interference, as shown in Table 4.

| PUCCH Reporting Type | Mode State | | PUCCH Reporting Modes Mode 1-1(bits/BP) with maximum 11 bits to be used |
| --- | --- | --- | --- |
| 2 | 2 antenna ports RI = 1 | 6 for wideband CQI/PMI | 1 bit to indicate the antenna number if it's 2 or 4 and 1 bit to indicate the rank if it's rank 1 or rank >1. There are 3 bits left unused and can be used for indication of number of received antenna for mitigation of interference |
| | 4 antenna ports RI = 1 | 8 for wideband CQI/PMI | 1 bit to indicate the antenna number if it's 2 or 4 and 1 bit to indicate the rank if it's rank 1 or rank >1. 1 bit left unused and can be used for indication of number of received antenna for mitigation of interference |
| | 2 antenna ports RI > 1 | 8 for wideband CQI/PMI | 1 bit to indicate the antenna number if it's 2 or 4 and 1 bit to indicate the rank if it's rank 1 or rank >11 bit left unused and can be used for indication of number of received antenna for mitigation of interference |
| | 4 antenna ports RI > 1 | 11 for wideband CQI/PMI | Inter-stream interference mitigation is off |

2.1.3.1.2 Using Unused Combinations of PCI

In another embodiment the UE can use unused combinations of precoding indices. For example, when the UE is configured in MIMO mode or in MIMO mode with four transmit antennas the network node (e.g., Radio Network controller (RNC) in HSPA) can send a bit map for precoding weight restriction (e.g., 3GPP TS 25.214). This is to indicate to the UE on what precoding indices the UE should include when computing the Physical Cell ID (PCI) for Channel State Information (CSI) report. In one embodiment, the UE transmits an unused PCI to indicate to the network node (e.g. Node B) to indicate whether it can cancel or can't cancel the interference of MIMO streams. In a corresponding manner, the network node and/or another UE receives the information based on the number of multi-antenna streams (Z) in an unused PCI from the first UE indicating whether the first UE can cancel or can't cancel the interference of MIMO streams.

2.1.3.1.3 Using Unused Combinations of RI/NTBP

In another embodiment the UE transmits the information on an unused rank indicator (RI) message and/or Number of Transport Blocks Preferred (NTBP) message to indicate to the first network node (e.g. Node B) the determined information related to the parameter Z. In a corresponding manner, the network node receives information based on the number of multi-antenna streams (Z) in defined bit locations in a RI message field and/or a NTBP message field from the first UE.

2.1.3.2 Using Unused Combinations of HARQ Ack

For HSPA system, in general the HARQ-ACK is represented by a 10 bit code. In LTE when 3 downlink (DL) component carriers (CCs) are deployed with TM3, each CC uses 2 codewords to transmit data, resulting in a total number of ACKNACK bits of 6. If ACKNACK bits in PUCCH with PUCCH format 3 the number of bits used for ACKNACK is 21. If the ACKNACK bits are transmitted in PUSCH, there are 20 bits reserved for ACKNACK. In LTE when single carrier is deployed with ACKNACK feedback mode as PUCCH 1b with channel selection the maximum number of ACKNACK bits to be used is 4. When it's under transmission mode with single layer the unused bits is maximum 3 bits. In accordance with another present embodiment, when only a few combinations are used to represent the ACK and Nack combinations, the UE transmits the determined information related to the parameter Z using an unused combination of HARQ-ACK bits.

2.1.3.3 Validity of Reported Information

The information about the value of Z for per carrier reported by the first UE to the first network node and/or the second network node may be considered valid by the first and the second network nodes for a threshold time (time period or time unit). The threshold time unit may be defined based on a subframe, TTI, time slot, frames, etc. The threshold time may be determined based on one or more pre-defined rules and/or indications from the first UE. Example rules or indications that may be used to determine the validity of the information include any one or more of the following:
Information is valid only in time unit in which the information is received at the network node;
Last received information remains valid until the reception of the new information at the network node;
Information is valid for L number of time units starting from a reference time, T, where T can be a time when the information is received or a reference time unit (e.g. SFN=0); and/or
Information received in certain time unit (e.g. subframe n) is valid or applicable for subframe n+m, where m is 1 or more integer value.

In the embodiment of FIG. 22, the first UE transmits (block 2200) information to the first network node and/or the second network node indicating a threshold time during which the information remains valid for identifying the number of multi-antenna streams (Z) whose interference can be currently mitigated by the first UE.

In a corresponding manner according to the embodiment of FIG. 23, the first network node and/or the second network node receives (block 2300) information from the first UE indicating a threshold time during which the information remains valid for identifying the number of multi-antenna streams (Z) whose interference can be currently mitigated by a first UE. The network node uses the obtained information to perform (block 1202) the one or more radio operational tasks only before the threshold time has expired.

3 Method in Network Node of Using Information about Multi-Antenna Inter-Stream Interference Mitigation Restriction The network node receiving or obtaining the information identifying a number of multi-antenna streams (Z) whose interference can be currently mitigated by the first UE, may use the information to perform one or more radio operational or radio resource management tasks as described below.

According to yet another aspect of this embodiment the network node may autonomously determine the number of multi-antenna streams (Z) for per carrier, e.g. without receiving explicit information from the first UE. For example the first network node may compare the CSI values (e.g. CQI) received from the UE for different multi-antenna streams with their respective thresholds or reference values under certain radio conditions e.g. multipath fading channel, low UE speed or Doppler speed of UE etc. If the reported CSI value under given conditions is below a threshold then the first network node may assume that the first UE is not mitigating the interference caused by the multi-antenna stream(s).

In the embodiment of FIG. 24, the network node can determine (block 2400) the number of multi-antenna streams (Z) whose interference can be currently mitigated by the first UE based on CSI values received from the first UE for different multi-antenna streams. In a further embodiment, the network node can determine (block 2400) the number of multi-antenna streams (Z) based on comparison of the CSI values to one or more threshold values.

The network node can perform (block 1202 of FIG. 12) one or more radio operational tasks using the information based on (e.g., which identifies) the number of multi-antenna streams (Z) whose interference can be currently mitigated by a first UE at the first UE. The radio operational tasks may include adaptive scheduling, adapting link adapting, adapting multi-antenna configuration of UEs, and/or transmitting information to other network nodes. These other further example radio operational tasks that may be performed by the network node using the information can include one or more of the following:
Adapting scheduling: For example the first network node may schedule the UE with a shorter transport block size if the first UE cannot mitigate inter-stream interference or can do so for limited multi-antenna streams. In another exemplary implementation the first network node may reduce the number of simultaneous UEs for scheduling data.
Adapting link adapting: For example the first network node may use more robust transport format (e.g. lower code rate like ½ and/or lower order modulation type like QPSK) for scheduling the first UE if the first UE cannot mitigate inter-stream interference or can do so for limited multi-antenna streams.

Adapting multi-antenna configuration of UEs: The first network node may schedule the first UE with smaller number of multi-antenna streams than the maximum value supported by the first UE, provided the first UE cannot mitigate inter-stream interference or can do so for limited multi-antenna streams.

Transmitting information to other network nodes: The first network node may also signal the received information to another network node. For example the first network node may send it to the second network node (such as by Node B to RNC over Iub interface in HSPA) and/or to even a third network node (e.g. neighboring base station such as by serving eNode B to neighboring eNode over X interface in LTE) etc. The receiving network node may use the received information for one or more radio tasks. For example the RNC may adapt or modify one or more UEs (first, second or third UEs) with the number of multi-antenna streams. For example the number of streams can be reduced to reduce inter-stream interference at the first UE if the first UE cannot mitigate inter-stream interference or can do so for limited multi-antenna streams. On the other hand the number of streams can be increased compared to the currently configured value, if the first UE is able to mitigate inter-stream interference from all its supported or larger number of its supported multi-antenna streams.

4 Method in Use of Indicating its Capability Associated with Multi-Antenna Inter-Stream Interference Mitigation Restriction According to some further embodiments, the first UE signals to the first or the second network node (e.g. RNC, eNode B, Node B, BS, relay, core network node etc) the first UE's interference mitigation configuration information indicating that the first UE is configured to mitigate interference caused by up to Y multi-antenna streams, which can be indicated for each of a plurality of different channels or carriers. The first UE may furthermore signal information identifying a number of multi-antenna streams (Z) whose interference can be currently mitigated by a first UE for per carrier to the first or the second network node, such as according to one or more embodiments described above in Sections 2 and 3.

The first UE may signal the information for per carrier related to the current number of multi-antenna streams whose interference can be mitigated by the first UE to the network node. More specifically the information can include a current status of the first UE's multi-antenna inter-stream interference mitigation capability. The information may also be associated with one or more frequency bands supported by the first UE or for all bands supported by the first UE. The information may also be associated for multi-antenna inter-stream interference mitigation capability for all types of MIMO or for one or more types of MIMO e.g. SU-MIMO, MU-MIMO, for mitigating inter-steam interference from own streams, from UEs in serving cell, from UEs in one or more neighboring cells etc.

The first UE typically signals the above mentioned information to the network node using higher layer protocol signaling e.g. RRC protocol.

The UE may send the information provide by one or more embodiments to the network node by any one or more of the following operations:

Proactive reporting without receiving any explicit request from the network node (e.g. serving or any target network node)

Reporting upon receiving any explicit request from the network node (e.g. serving or any target network node)

The explicit request can be sent to the UE by the network anytime, at any specific occasion, in response to a trigger or an event when certain condition is met. For example the request for the information reporting can be sent to the UE during initial setup or after a cell change (e.g. handover, RRC connection re-establishment, RRC connection release with redirection, PCell or primary serving cell change in CA, primary component carrier (PCC) or primary carrier change in CA etc). In another example the UE may send the information to the network node when a defined condition is satisfied, such as when a signal quality is below a certain threshold or when operating in certain frequency band.

The network node (e.g. serving RNC, BS, Node B, eNode B, BS etc) uses at least the received first UE information in order to decide the number of multi-antenna streams to be configured at the UE. The network node may also forward the received first UE capability information to other network node, e.g. to neighboring network node, to radio network node such as BS or RNC if it is available in the core network node, SON, O&M, OSS etc. This will avoid the need for the first UE to again reports its information to multiple network node or to a new serving network node after the cell change e.g. after handover. In this way signaling overheads can be reduced and the target network node can quickly select the multi-antenna configuration for that UE.

5 Potential Advantages

Various advantages that may be obtained by one or more embodiments disclosed herein is that under certain conditions the UE may not be able to fully mitigate inter-stream interference from all possible multi-antenna streams supported by it. The UE determines the current status of its capability in terms of the current number of multi-antenna streams whose interference it can be mitigate, and transmits this information to the network node (e.g. serving BS). The network node then uses the received information to perform one or more radio operational tasks which may can provide more efficient use of radio resources and enhanced system performance.

6 Abbreviations

Figure 25:
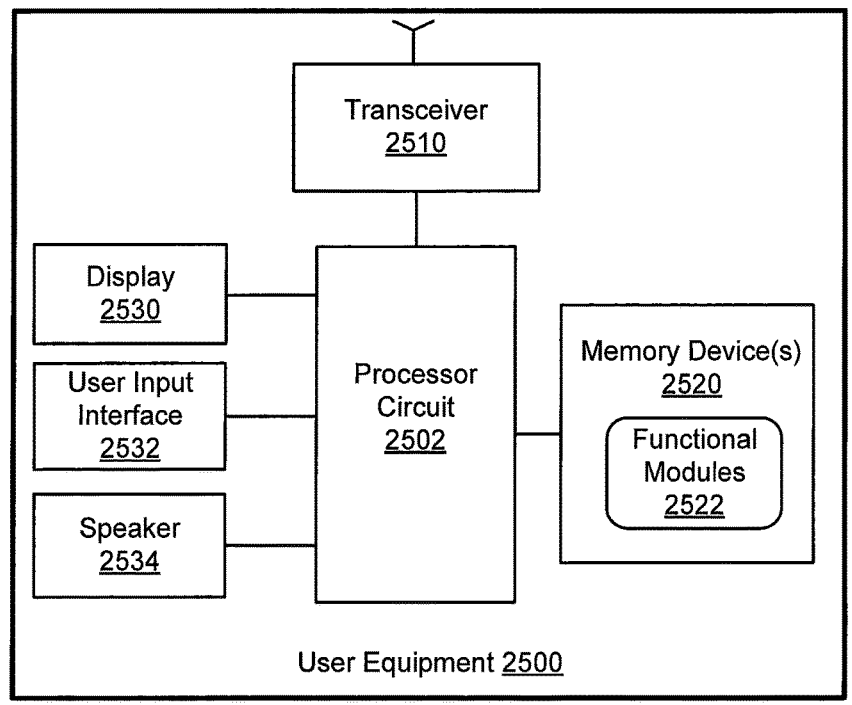
FIG. 25 is a block diagram of a UE according to some embodiments.

ACK Acknowledgement
BLER Block error rate
CRC Cyclic redundancy check
CSI Channel State Information
CQI Channel quality Indicator
CWIC Codeword Level Interference Cancellation
HARQ Hybrid automatic repeat request
HSDPA High Speed Downlink Packet Access
IC Interference Cancellation
MIMO Multiple input multiple output
NAK Non-acknowledgement
NTBP Number of transport blocks preferred
PCI Precoding control index
PBCH Physical Broadcast Channel PCFICH Physical control format indicator channel
PDCCH Physical Downlink Control Channel
PDSCH Physical Downlink Shared Channel
PMI Precoding Matrix Index
RI Rank information
SLIC Symbol Level Interference Cancellation
SINR Signal to interference plus noise ratio
SNR Signal to noise ratio
TTI Transmit Time Interval
UE User Equipment 7 Example User Equipment and Network Node FIG. 25 is a block diagram of a UE 2500 that is configured to perform operations according to one or more embodiments disclosed herein. The UE 2500 includes a transceiver 2510, a processor circuit(s) 2502, and a memory device(s) 2520 containing functional modules 2522. The UE 2500 may further include a display 2530, a user input interface 2532, and a speaker 2534.

The transceiver 2510 is configured to communicate with a network node through a wireless air interface using one or more of the radio access technologies disclosed herein. The processor circuit 2502 may include one or more data processing circuits, such as a general purpose and/or special purpose processor, e.g., microprocessor and/or digital signal processor. The processor circuit 2502 is configured to execute computer program instructions from the functional modules 2522 of the memory device(s) 2520 to perform at least some of the operations described herein as being performed by a UE.

Figure 26:
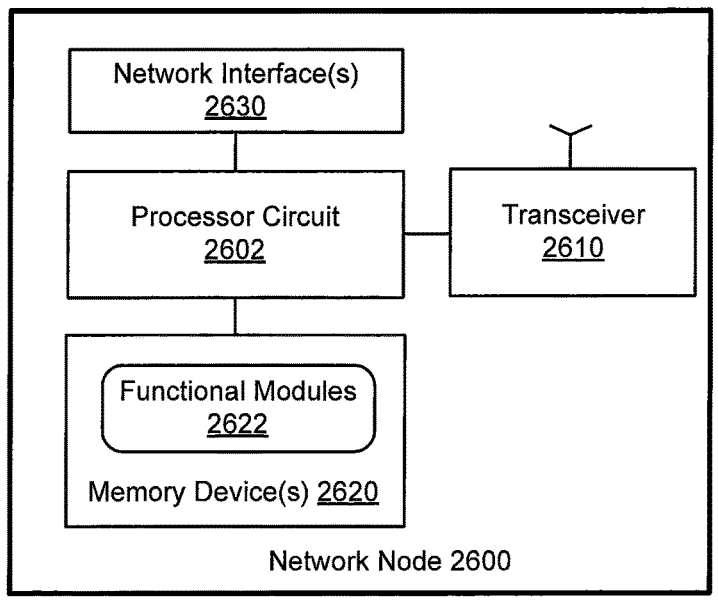
FIG. 26 is a block diagram of a network node according to some embodiments.

FIG. 26 is a block diagram of a network node 2600 that is configured according to one or more embodiments disclosed herein for a radio network node or other network node. The network node 2600 can include a transceiver 2610, a network interface(s) 2630, a processor circuit 2602, and a memory device(s) 2620 containing functional modules 2622.

The transceiver 2610 is configured to communicate with the UE 2500 using one or more of the radio access technologies disclosed herein, which the network node 2600 is a radio network node. The processor circuit 2602 may include one or more data processing circuits, such as a general purpose and/or special purpose processor, e.g., microprocessor and/or digital signal processor, that may be collocated or distributed across one or more networks. The processor circuit 2602 is configured to execute computer program instructions from the functional modules 2622 of the memory device(s) 2620 to perform at least some of the operations and methods of described herein as being performed by a network node. The network interface 2630 communicates with other network nodes and/or a core network.

Figure 27:
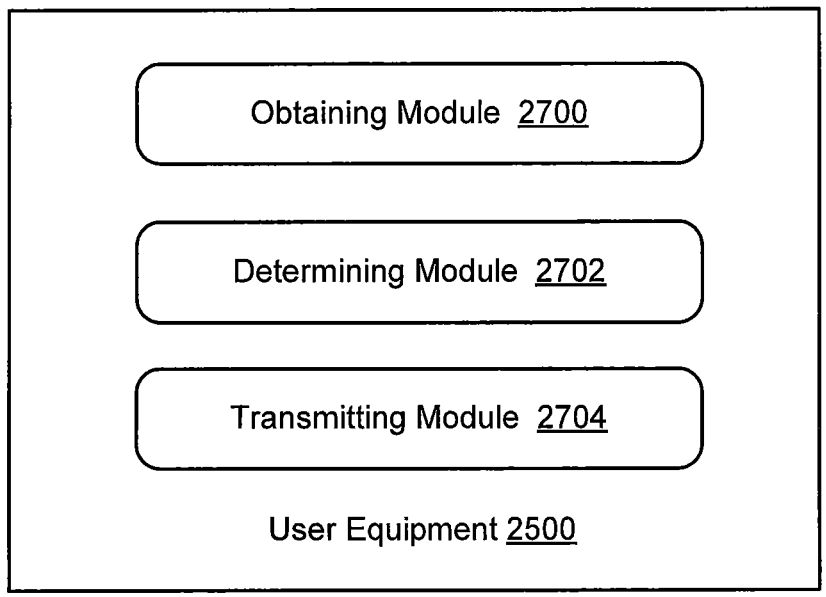
FIG. 27 is a block diagram of functional modules that may be implemented within a UE according to some embodiments.

FIG. 27 illustrates modules residing in the UE 2500 that perform operations as disclosed herein. The modules include an obtaining module 2700 that operates as explained above for block 1100, a determining module 2702 that operates as explained above for block 1102, and a transmitting module 2704 that operates as explained above for block 1104. More particularly, the obtaining module 2700 may operate according to blocks 1300 and/or 1400 as described above. The determining module 2702 may operate according to blocks 1500-1502, 1600-1602, 1700-1702, 1800-1802, 1900, 2000, and/or 2100-2102 as described above. The transmitting module 2704 may operate according to block 2200 as described above. The modules 2700, 2702, and/or 2704 may be implemented by combination of computer software residing in the memory 2520 which is executed by the processor 2502. The modules 2700, 2702, and/or 2704 may alternatively be implemented in digital logic circuits and/or analog circuits within the UE 2500.

Figure 28:
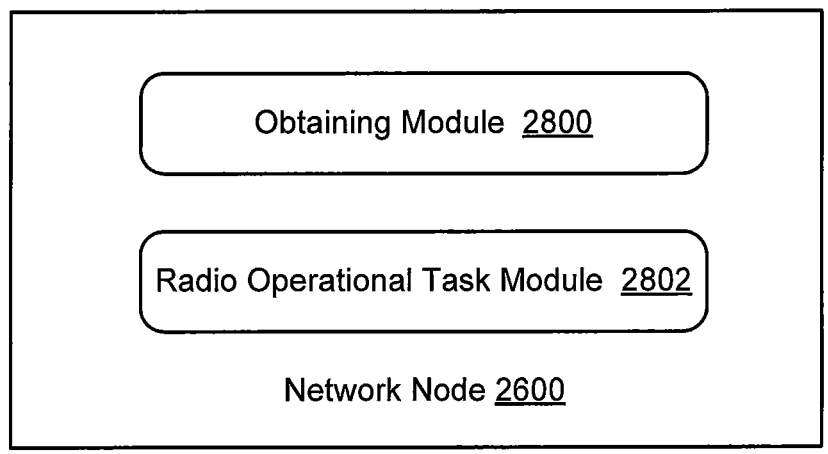
FIG. 28 is a block diagram of functional modules that may be implemented within a network node according to some embodiments.

FIG. 28 illustrates modules residing in the network node 2600 that perform operations as disclosed herein. The modules include an obtaining module 2800 that operates as explained above for block 1200 and a radio operational task module 2802 that operates as explained above for block 1202. The obtaining module 2800 may operate according to blocks 2100-2102 and/or 2300. The modules 2800 and 2802 may be implemented by combination of computer software residing in the memory 2620 which is executed by the processor 2602. The modules 2800 and 2802 may alternatively be implemented in digital logic circuits and/or analog circuits within the network node 2600.

8 Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a first user equipment, UE, that is configured to mitigate multi-antenna inter-stream interference, the method comprising:
   determining, based on one or more criteria, a number of multi-antenna streams Z whose interference can be currently mitigated by the first UE, the multi-antenna streams Z being associated with at least one communication channel; and
   transmitting information based on the number of multi-antenna streams Z to a first network node, to a second network node, and/or to a second UE.

2. The method of claim 1, further comprising:
   obtaining interference mitigation configuration information indicating that the first UE is configured to mitigate interference caused by up to Y multi-antenna streams at the first UE.

3. The method of claim 2, wherein obtaining interference mitigation configuration information comprises:
   reading the interference mitigation configuration information from a memory.

4. The method of claim 2, wherein obtaining interference mitigation configuration information comprises:
   determining the interference mitigation configuration information based on a Multiple Input Multiple Output, MIMO, circuit configuration of the first UE.

5. The method of claim 2, wherein the at least one communication channel comprises a plurality of different communication channels; and
   wherein the interference mitigation configuration information indicates for each of the plurality different communication channels up to how many multi-antenna streams the first UE is configure to mitigate interference from.

6. The method of claim 1, wherein determining, based on one or more criteria, a number of multi-antenna streams Z whose interference can currently be mitigated by the first UE, comprises;
   determining a remaining life of a battery supplying power to the first UE; and
   determining the number of multi-antenna streams Z based on the remaining life of the battery.

7. The method of claim 1, wherein determining, based on one or more criteria, a number of multi-antenna streams Z whose interference can currently be mitigated by the first UE, comprises:
   determining that the first UE is mitigating interference from a reference signal and/or a control channel; and
   determining a reduced number of the multi-antenna inter-streams Z whose interference can currently be mitigated, based on the determination that the first UE is mitigating interference from a reference signal and/or a control channel.

8. The method of claim 1, wherein determining, based on one or more criteria, a number of multi-antenna streams Z whose interference can currently be mitigated by the first UE, comprises:

identifying a number of streams having a signal quality above a first threshold level or signal strength above a second threshold; and determining the number of multi-antenna streams Z whose interference can currently be mitigated, based on the number of streams having a signal quality above a first, threshold level or signal strength above a second threshold.

9. The method of claim 1, wherein determining, based on one or more criteria, a number of multi-antenna streams Z whose interference can currently be mitigated by the first UE, comprises:

limiting the number of multi-antenna streams Z whose interference can currently be mitigated at the first UE to only a defined type of inter-stream interference mitigation.

10. The method of claim 1, wherein determining, based on one or more criteria, a number of multi-antenna streams Z whose interference can currently be mitigated by the first UE, comprises:

limiting the number of multi-antenna streams Z whose interference can currently be mitigated at the first UE to multi-antenna streams received from one of a Primary Cell, PCell, or a Secondary Cell, SCell.

11. The method of claim 1, wherein the at least one communication channel comprises a plurality of different communication channels; and wherein determining, based on one or more criteria, a number of multi-antenna streams Z whose interference can currently be mitigated by the first UE, comprises:

repeating the determining of the number of multi-antenna streams Z for each of the plurality of different communication channels.

12. The method of claim 1, wherein transmitting the number of multi-antenna streams Z to a first network node, to a second network node, and/or to a second UE; comprises:

transmitting the information based on the number of multi-antenna streams Z in a Hybrid Automatic Repeat Request, HARQ, feedback measurement report.

13. The method of claim 1, wherein transmitting the number of multi-antenna streams Z to a first network node, to a second network node, and/or to a second UE, comprises:

embedding the information based on the number of multi-antenna streams Z in a Channel Quality Indicator, CQI, report.

14. The method of claim 1, wherein transmitting the number of multi-antenna streams Z to a first network node, to a second network node, and/or to a second UE, comprises:

transmitting the information based on the number of multi-antenna streams Z using a type 2 format for Physical Uplink Control Channel (PUCCH) reporting.

15. The method of claim 1, wherein transmitting the number of multi-antenna streams Z to a first network node, to a second network node, and/or to a second UE, comprises:

transmitting an unused Physical Cell ID, PCI, to the first network node and/or to the second network node to indicate whether the first UE can cancel or can't cancel the interference of MIMO streams.

16. The method of claim 1, wherein transmitting the number of multi-antenna streams Z to a first network node, to a second network node, and/or to a second UE, comprises:

transmitting the information based on the number of multi-antenna streams Z using defined bit locations in a rank indicator, RI, message field and/or a Number of Transport Block Preferred, NTBP, message field.

17. The method of claim 1, wherein transmitting the number of multi-antenna streams Z to a first network node, to a second network node, and/or to a second UE, comprises:

transmit a defined value in a first one of CQI1 and CQI2 to signal to the first network node and/or to the second network node that the other one of CQI1 and CQI2 contains a value of the information based on the number of multi-antenna streams Z whose interference can be currently mitigated by the first UE.

18. The method of claim 1, wherein transmitting the number of multi-antenna streams Z to a first network node, to a second network node, and/or to a second UE, comprises;

transmitting information to the first network node and/or the second network node indicating a threshold time during which the information remains valid for identifying the number of multi-antenna streams Z whose interference can be currently mitigated by the first UE.

19. The method of claim 1, further comprising initiating the transmission of the information based on the number of multi-antenna streams Z to the first network node, to the second network node, and/or to the second UE responsive to a change, in the value of the number of multi-antenna streams Z for one of carriers relative to a previously determined number of multi-antenna streams Z for that carrier.

20. The method of claim 1, further comprising transmitting a capability information to the first network node, to the second network node, and/or to the second UE, said capability indicating that the first UE is capable of adapting the current number of multi-antenna streams whose interference can be mitigated by the first UE.

21. A method by a first network node serving or managing a first UE configured to mitigate multi-antenna inter-stream interference, the method comprising:

obtaining information based on a number or multi-antenna streams Z whose interference can be currently mitigated by a first UE at the first UE, the multi-antenna streams Z being associated with at least one communication channel; and performing one or more radio operational tasks using the information based on the number of multi-antenna streams Z whose interference can be currently mitigated by a first UE at the first UE.

22. The method of claim 21, wherein the at least one communication channel comprises a plurality of different communication channels; and wherein the information identifies for each of the plurality of different communication channels the number of multi-antenna streams Z, at the respective one of the communication channels, whose interference can currently be mitigated.

23. The method of claim 21, wherein the information indicates a present status of the first UE's multi-antenna inter-stream interference mitigation capability.

24. The method of claim 21, wherein the one or more radio operational tasks performed using the obtained information comprises adapting scheduling, adapting transport format of a communication link, adapting multi-antenna configuration of one or more UEs, and transmitting further information based on the obtained information to other network nodes.

25. The method of claim 21, wherein obtaining the information comprises receiving the information based on the number of multi-antenna streams Z in a Hybrid Automatic Repeat Request, HARQ, feedback measurement report from the first UE.

26. The method of claim 21, wherein obtaining the information comprises receiving the information based on the number of multi-antenna streams Z in a Channel Quality Indicator, CQI, report from the first UE.

27. The method of claim 21, wherein obtaining the information comprises receiving the information based on the number of multi-antenna streams Z in a type 2 format for Physical Uplink Control Channel (PUCCH) reporting from the first UE.

28. The method of claim 21, wherein obtaining the information comprises receiving the information based on the number of multi-antenna streams Z in an unused Physical Cell ID, PCI, from the first UE indicating whether the first UE can cancel or cant cancel the interference of MIMO streams.

29. The method of claim 21, wherein obtaining the information comprises receiving the information based on the number of multi-antenna streams Z in defined bit locations in a rank indicator, RI, message field and/or a Number of Transport Block Preferred, NTBP, message field, from the first UE.

30. The method of claim 21, wherein obtaining the information comprises:
receiving CQI1 and CQI2 values from the first UE; and
determining from a first one of CQI1 and CQI2 containing a defined value that the other one of CQI1 and CQI2 contains a value of the information based on the number of multi-antenna streams Z whose interference can be currently mitigated by the first UE.

31. The method of claim 21, further comprising:
receiving information from the first 13 indicating a threshold time during which the information remains valid for identifying the number of multi-antenna streams Z whose interference can be currently mitigated by a first UE.

32. The method of claim 21, wherein obtaining information based on the number of multi-antenna streams Z whose interference can be currently mitigated by a first UE at the first UE, comprises:
determining the information based on CSI values received from the first UE for different multi-antenna streams.

33. The method of claim 32, wherein determining the information based on CSI values received front the first UE for different multi-antenna streams, comprises:
comparing the CSI values to one or more threshold values.

34. The method of claim 21, further comprising receiving a capability information from a first UE, said capability indicating that the first UE is capable of adapting the current number of multi-antenna streams whose interference can be mitigated by the first UE.

\* \* \* \* \*